US012811261B2

(12) United States Patent
Tsushima et al.

(10) Patent No.: US 12,811,261 B2
(45) Date of Patent: Nov. 24, 2026

(54) NON-AQUEOUS ELECTROLYTE SECONDARY BATTERY

(71) Applicant: SANYO Electric Co., Ltd., Kadoma (JP)

(72) Inventors: Tatsuya Tsushima, Hyogo (JP); Takashi Hosokawa, Hyogo (JP)

(73) Assignee: SANYO Electric Co., Ltd., Osaka (JP)

( * ) Notice: Subject to any disclaimer, the term of this patent is extended or adjusted under 35 U.S.C. 154(b) by 695 days.

(21) Appl. No.: 17/802,321

(22) PCT Filed: Feb. 8, 2021

(86) PCT No.: PCT/JP2021/004628

§ 371 (c)(1),
(2) Date: Aug. 25, 2022

(87) PCT Pub. No.: WO2021/186947

PCT Pub. Date: Sep. 23, 2021

(65) Prior Publication Data

US 2023/0091100 A1 Mar. 23, 2023

(30) Foreign Application Priority Data

Mar. 17, 2020 (JP) ................................ 2020-046316

(51) Int. Cl.
*H01M 50/54* (2021.01)
*H01M 50/103* (2021.01)
*H01M 50/184* (2021.01)
*H01M 50/55* (2021.01)

(52) U.S. Cl.
CPC ......... *H01M 50/54* (2021.01); *H01M 50/103* (2021.01); *H01M 50/184* (2021.01); *H01M 50/55* (2021.01)

(58) Field of Classification Search
CPC ............................ H01M 50/103; H01M 50/54
See application file for complete search history.

(56) References Cited

U.S. PATENT DOCUMENTS

| | | | | |
|---|---|---|---|---|
| 10,320,025 | B2 * | 6/2019 | Hiroki | H01M 50/557 |
| 10,418,612 | B2 * | 9/2019 | Shinoda | H01M 50/536 |
| 2006/0240319 | A1 | 10/2006 | Chun | |
| 2009/0239133 | A1 * | 9/2009 | Kosugi | H01M 50/538 429/94 |
| 2014/0193710 | A1 | 7/2014 | Hasegawa | |
| 2015/0072204 | A1 | 3/2015 | Kwon et al. | |
| 2020/0251787 | A1 | 8/2020 | Shinoda et al. | |

FOREIGN PATENT DOCUMENTS

| | | | |
|---|---|---|---|
| CN | 207441852 | U | 6/2018 |
| JP | 2014-22116 | A | 2/2014 |
| JP | 2016-85875 | A | 5/2016 |
| JP | 2017-50069 | A | 3/2017 |
| JP | 2018-133306 | A | 8/2018 |
| JP | WO2017/145212 | A1 | 12/2018 |
| JP | 2019-61779 | A | 4/2019 |
| WO | 2013/031891 | A1 | 3/2013 |
| WO | 2019/088053 | A1 | 5/2019 |

OTHER PUBLICATIONS

Machine translation of WO-2013031891-A1 (Year: 2013).*
Machine translation of JP-2014022116-A (Year: 2014).*
Machine translation of JP-2017050069-A (Year: 2017).*
English translation of Specification of JP2017-050069A that the original language was previously filed on Aug. 25, 2022.
English translation of Specification of JP2014-022116A that the original language was previously filed on Aug. 25, 2022.
Office Action dated Jan. 10, 2023, issued in counterpart IN application No. 202247057856. (6 pages).
English Machine Translation of Specification of JP 2017-050069 A that the original language document and its abstract previously cited and filed on Aug. 25, 2022. (20 pages).
English Machine Translation of Specification of JP 2014-022116 A that the original language document and its abstract previously cited and filed on Aug. 25, 2022. (17 pages).
English Machine Translation of Specification of JP 2018-133306 A that the original language document and its abstract previously cited and filed on Aug. 25, 2022. (28 pages).
English Machine Translation of Specification of JP 2019-061779 A that the original language document and its abstract previously cited and filed on Aug. 25, 2022. (14 pages).
English Machine Translation of Specification of CN 207441852 U that the original language document and its abstract previously cited and filed on Aug. 25, 2022. (11 pages).
Extended (Supplementary) European Search Report dated Oct. 25, 2023, issued in counterpart EP Application No. 21770428.7. (8 pages).
International Search Report dated Apr. 27, 2021, issued in counterpart International Application No. PCT/JP2021/004628, w/English translation (7 pages).

* cited by examiner

*Primary Examiner* — Jonathan Johnson
(74) *Attorney, Agent, or Firm* — WHDA, LLP

(57) ABSTRACT

A secondary battery includes an electrode body having an electrode plate, a rectangular exterior body, a sealing plate, an electrode terminal, a first current collector arranged between the electrode body and the sealing plate and connected to the electrode terminal, a second current collector arranged between the electrode body and a side wall of the rectangular exterior body and connected to the first current collector, and a tab group formed such that multiple electrode tabs extending from the electrode plate toward the side wall are stacked on each other and connected to the second current collector. The tab group is connected to the second current collector, and is bent in parallel with the side wall. The curvature radius of a first rounded portion of a base portion of each tab is greater than the curvature radius of a second rounded portion of a tip portion of each tab.

4 Claims, 9 Drawing Sheets

NON-AQUEOUS ELECTROLYTE SECONDARY BATTERY

TECHNICAL FIELD

The present disclosure relates to a non-aqueous electrolyte secondary battery.

BACKGROUND ART

The configuration of a non-aqueous electrolyte secondary battery such as a lithium ion battery has been known, in which a tab group extending from an electrode body housed in a rectangular exterior body is connected to an external terminal on a sealing plate through a current collector.

Patent Document 1 discloses a current collector including a base portion arranged between a sealing plate and an electrode body and a stem portion extending from are end of the base portion toward a bottom along a side wall of an exterior body. The base portion is connected to an external terminal, and the stem portion is connected to an electrode plate stack (a tab group) drawn from the electrode body.

CITATION LIST

Patent Document

PATENT DOCUMENT 1: Japanese Unexamined Patent Publication No. 2016-85875

SUMMARY OF THE INVENTION

Since the stem portion is arranged between the electrode body and the side wall of the exterior body in the current collector disclosed in Patent Document 1, a space where the stem portion is arranged is a dead space not contributing to power generation. This leads to a lower volumetric energy density of a battery.

A secondary battery of the present disclosure includes: an electrode body having an electrode plate; a rectangular exterior body having an opening and housing the electrode body; a sealing plate sealing the opening; an electrode terminal provided on the sealing plate; a first current collector arranged between the electrode body and the sealing plate and connected to the electrode terminal; a second current collector arranged between the electrode body and a side wall of the rectangular exterior body and connected to the first current collector, and a tab group formed such that multiple electrode tabs extending from the electrode plate toward the side wall are stacked on each other and connected to the second current collector. The second current collector is formed of a flat plate having a surface parallel with the side wall. The tab group is bent on a connection portion side with the second current collector in parallel with the side wall. Each electrode tab has a first rounded portion formed in a rounded shape and provided at each of corner portions of both sides in a width direction of a base portion continuous to the electrode plate, and a second rounded portion formed in a rounded shape and provided at each of corner portions on both sides in a width direction of a tip portion in a direction in which the electrode tab extends. The curvature radius of the first rounded portion is greater than the curvature radius of the second rounded portion.

According to the present disclosure, a secondary battery can be provided, which has a high volumetric energy density and configured so that stability in welding, between a tab group and a current collector can be ensured while current concentration is reduced.

DESCRIPTION OF EMBODIMENTS (Non-Aqueous Electrolyte Secondary Battery of Prior Application)

The applicant of the present application has disclosed the structure of a non-aqueous electrolyte secondary battery in the specification of the prior application (Japanese Patent Application No. 2019-174878).

Figure 1:
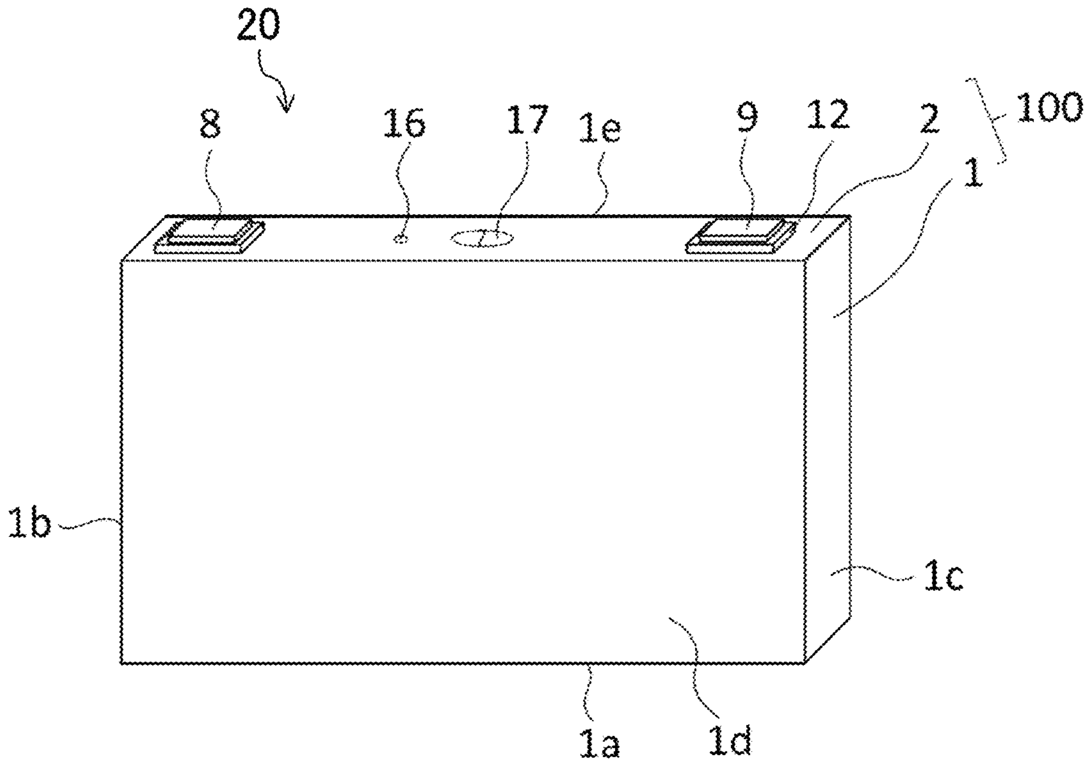
FIG. 1 is a perspective view of a non-aqueous electrolyte secondary battery.
Figure 2:
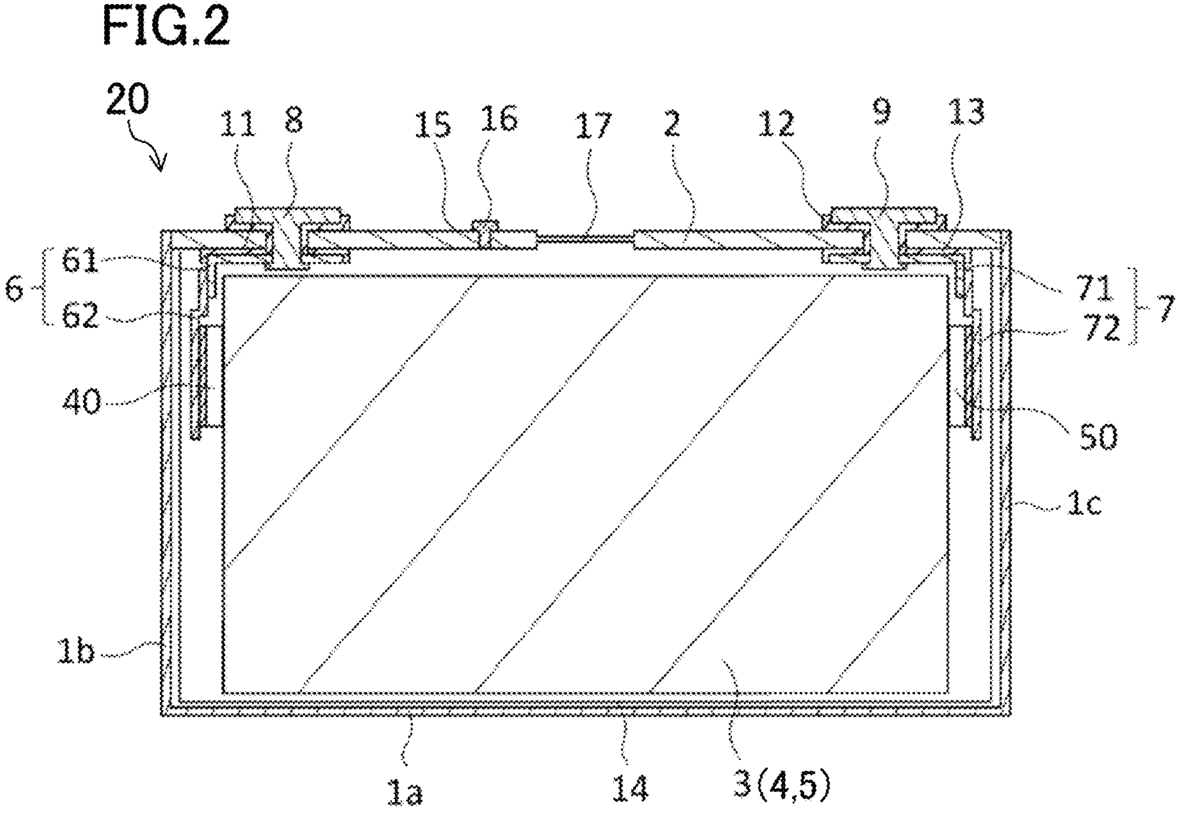
FIG. 2 is a sectional view of an internal structure of the non-aqueous electrolyte secondary battery.

In a non-aqueous electrolyte secondary battery 20 disclosed in the above-described specification, a tab group 40 of an electrode body 3 including electrode plates (a positive electrode plate 4 and a negative electrode plate 5) housed in a rectangular exterior body 1 and an electrode terminal 8 provided on a sealing plate 2 are electrically connected to each other through a first current collector 61 and a second current collector 62, as shown in FIGS. 1 and 2.

The first current collector 61 is arranged between the electrode body 3 and the sealing plate 2, and is connected to the electrode terminal 8. The second current collector 62 is arranged between the electrode body 3 and a side wall 1*b* of the rectangular exterior body 1, is formed of a flat plate having surfaces parallel with the side wall 1*b*, and is connected to the first current collector 61.

Figure 3:
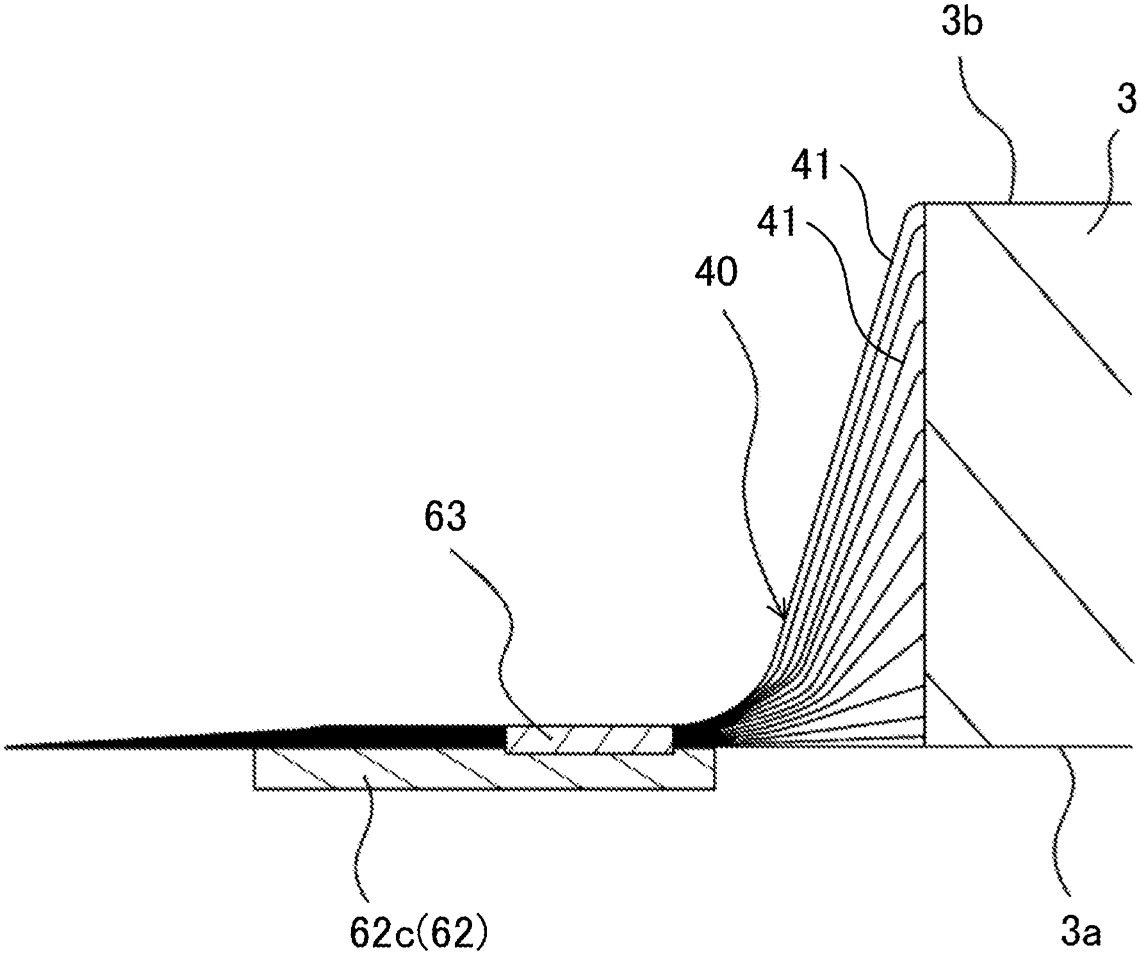
FIG. 3 shows the vicinity of a connection portion between a second current collector and a tab group before bending the tab group.
Figure 4:
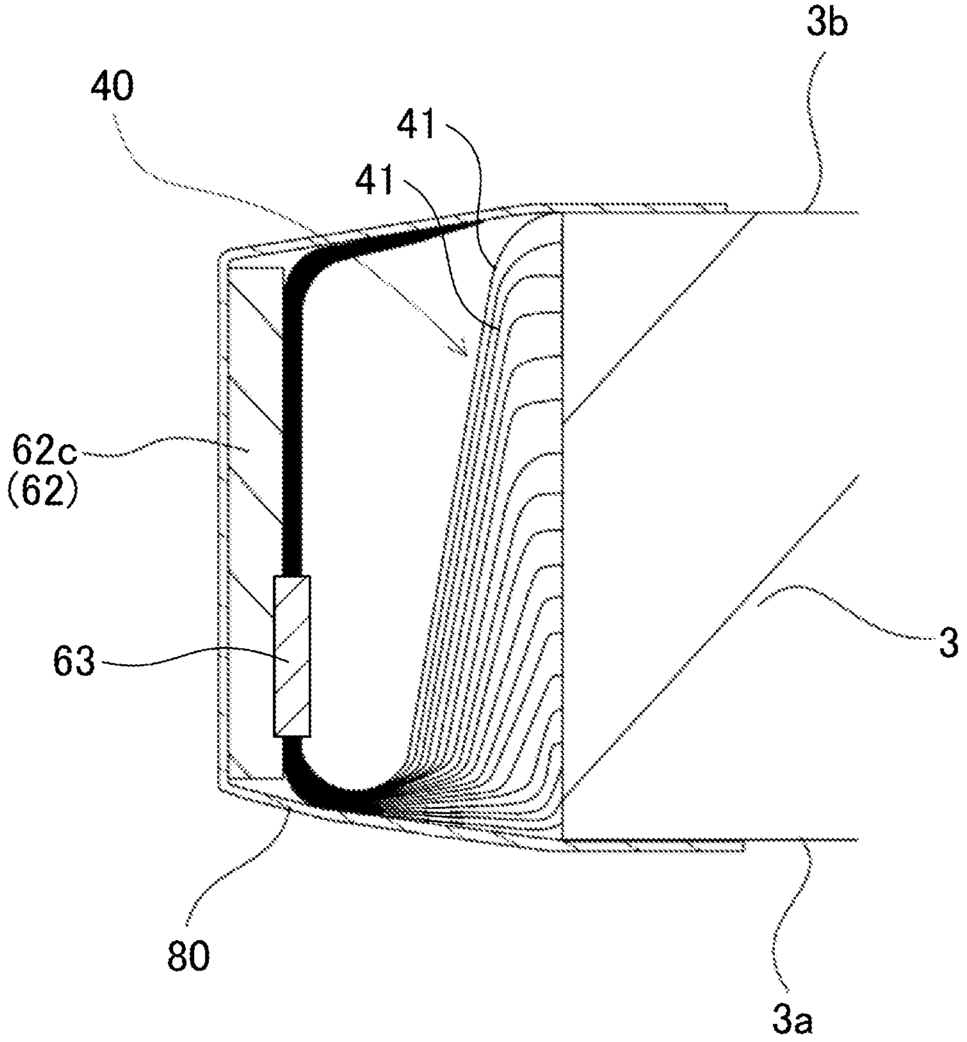
FIG. 4 shows the vicinity of the connection portion between the second current collector and the tab group after bending the tab group.
Figure 10:
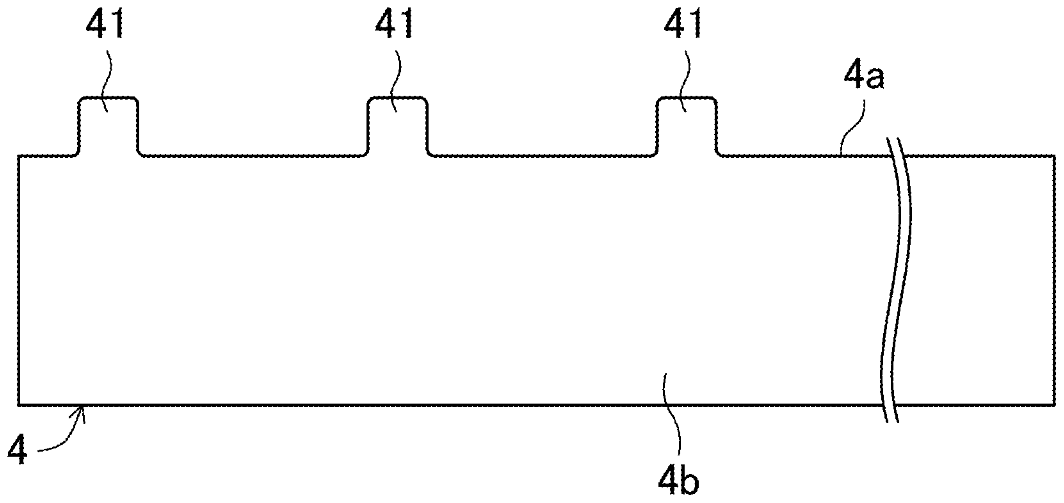
FIG. 10 shows electrode tabs extending from an electrode plate according to the prior application.
Figure 11:
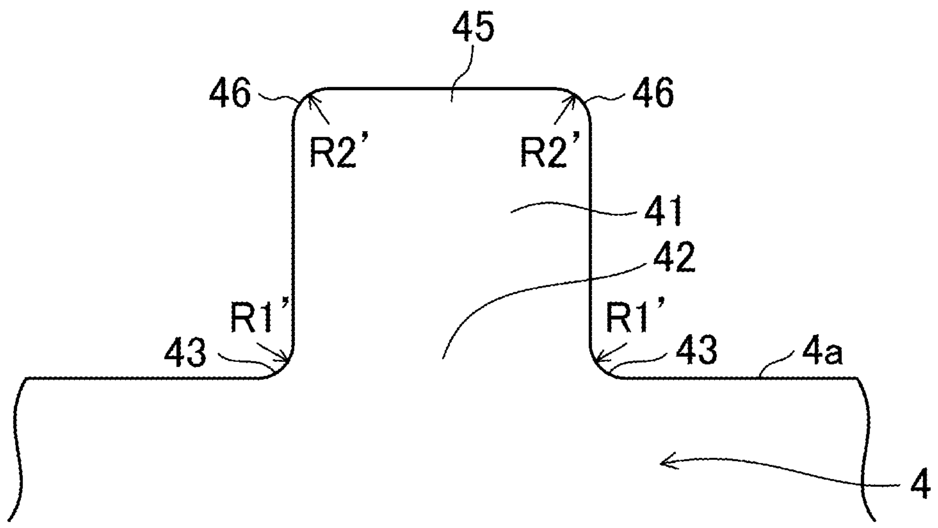
FIG. 11 shows details of the electrode tab according to the prior application.

As shown in FIGS. 10 and 11, the tab group 40 is formed such that multiple electrode tabs (e.g., positive electrode tabs 41) extending, from one edge 4*a* of the electrode plate (e.g., the positive electrode plate 4) in the lateral direction of the electrode plate are stacked on each other. As shown in FIG. 3, the tab group 40 extends from the electrode body 3 toward the side wall 1*b*, and is connected to the second current collector 62. As shown in FIG. 4, the tab group 40 is bent on a connection portion 63 side with the second current collector 62 in parallel with the side wall 1*b*.

According to such a configuration, the tab group 40 can be bent without the need for bending the second current collector 62. Accordingly, a non-aqueous electrolyte secondary battery with a high volumetric energy density can be produced in a simple manner.

The inventors of the present application have further improved the non-aqueous electrolyte secondary battery such that the curvature radius of each of both corner portions on both sides in a width direction of a base portion continuous to the electrode plate is greater than the curvature radius of each of both corner portions on both sides in a width direction of a tip portion. With this configuration, stability in welding between the tab group and the second current collector can be ensured while current concentration and stress concentration on both corner portions on both sides in the width direction of the base portion which is in connection with the electrode plate are reduced.

(Overall Configuration of Non-Aqueous Electrolyte Secondary Battery)

Hereinafter, an embodiment of the present disclosure will be described in detail with reference to the drawings. The following description of advantageous embodiments is a mere example in nature, and is not at all intended to limit the scope, applications, or use of the present disclosure. Since a basic configuration of a non-aqueous electrolyte secondary battery in the present embodiment is the same as that of the prior application, FIGS. 1, 2, 3, and 4 used in description of the prior application will be also used as reference.

FIG. 1 is a perspective view of a non-aqueous electrolyte secondary battery 20 according to the embodiment of the present disclosure. FIG. 2 is a sectional view of an internal structure of the non-aqueous electrolyte secondary battery 20. As shown in FIGS. 1 and 2, the non-aqueous electrolyte secondary battery 20 includes a battery case 100 having a rectangular exterior body 1 having an opening and a bottomed rectangular tubular shape and a sealing plate 2 sealing the opening of the rectangular exterior body 1.

The rectangular exterior body 1 has a bottom 1*a*, a pair of first side walls 1*b*, 1*c*, and a pair of second side walls 1*d*, 1*e*. The first side walls 1*b*, 1*c* in pair are arranged to face each other. The second side walls 1*d*, 1*e* in pair are arranged to face each other. The pair of first side walls 1*b*, 1*c* is perpendicular to the longitudinal direction of the sealing plate 2, and the area of the pair of first side walls 1*b*, 1*c* is smaller than that of the pair of second side walls 1*d*, 1*e*.

In the rectangular exterior body 1, an electrode body 3 including a positive electrode plate 4 and a negative electrode plate 5 as electrode plates is housed together with an electrolyte. In the present embodiment, the electrode body 3 is a flat electrode body in which the positive electrode plate 4 and the negative electrode plate 5 are wound with a separator interposed therebetween. The winding axis of the electrode body 3 extends perpendicularly to the first side walls 1*b*, 1*c* and parallel with the second side walls 1*d*, 1*e*. The electrode body 3 is not limited to the wound electrode body, and may be, for example, a stacked electrode body in which a positive electrode plate 4 and a negative electrode plate 5 are stacked with a separator interposed therebetween.

In FIG. 2, reference numeral 14 denotes a box-shaped or bag-shaped insulating sheet which is arranged in the rectangular exterior body 1 and houses the electrode body 3. Reference numeral 15 denotes an electrolyte injection hole provided in the sealing plate 2. Reference numeral 16 denotes a sealing member sealing the electrolyte injection hole 15. Reference numeral 17 denotes a gas discharge valve provided in the sealing plate 2.

In the non-aqueous electrolyte secondary battery 20, one side is a positive electrode side and the other side is a negative electrode side in a direction in which the winding axis of the electrode body 3 extends. The positive electrode side will be mainly described below, and description of the negative electrode side may be omitted.

A positive electrode tab group 40 is provided at one end of the electrode body 3 in the direction in which the winding axis extends. Specifically, the positive electrode tab group 40 extends from one end of the electrode body 3 toward the first side wall 1*b*. The positive electrode tab group 40 is formed such that positive electrode tabs 41, 41, multiple electrode tabs are stacked on each other.

Figure 5:
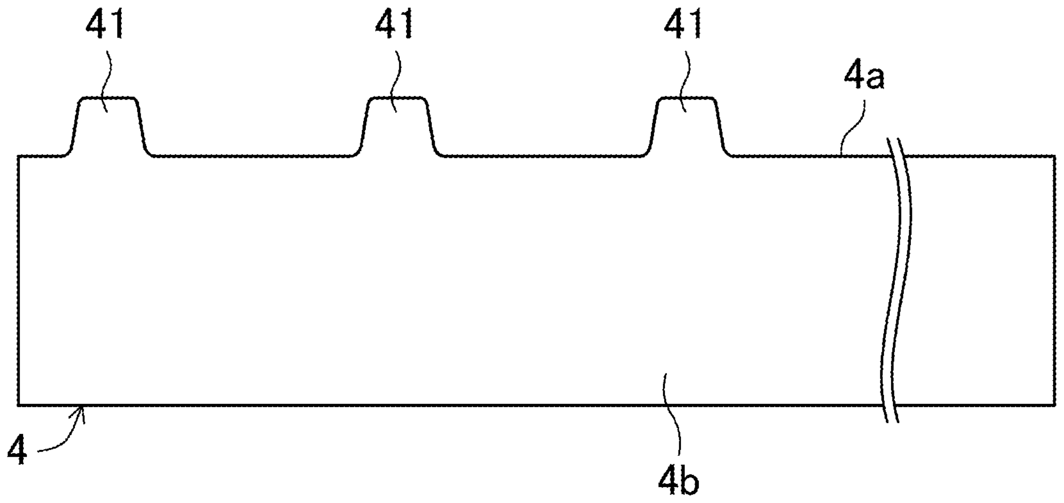
FIG. 5 shows electrode tabs extending from an electrode plate according to the present embodiment.

As shown in FIG. 5, the positive electrode plate 4 is in a long strip shape, and is formed in a substantially rectangular shape. The positive electrode plate 4 has a region where positive electrode active material layers 4*b* are formed on both surfaces of a positive electrode core. The multiple positive electrode tabs 41, 41, . . . extend from one edge 4*a* of the substantially-rectangular positive electrode plate 4 in the lateral direction thereof. The positive electrode tab 41 includes a positive electrode core exposed portion. A positive electrode protective layer having a lower electroconductivity than that of the positive electrode active material layer 4*b* is provided at a base of the positive electrode tab 41, i.e., a base portion 42 extending from the positive electrode plate 4. The positive electrode protective layer is not necessarily provided. The shape of the positive electrode tab (the electrode tab) 41 will be described in detail later.

The lateral direction of the positive electrode plate 4 is coincident with the winding axis direction of the wound electrode body 3. In other words, each positive electrode tab 41 extends from the positive electrode plate 4 toward the first side wall 1*b*.

As shown in FIG. 2, the sealing plate 2 is provided with a positive electrode terminal 8 as an electrode terminal. The positive electrode terminal 8 is electrically connected to the positive electrode tab group 40 through a positive electrode current collector 6. The positive electrode current collector 6 includes a first positive electrode current collector 61 and a second positive electrode current collector 62.

The first positive electrode current collector 61 has a substantially L-shaped doss section, and is arranged between the electrode body 3 and the sealing plate 2. Specifically, the first positive electrode current collector 61 has a first region arranged along the sealing plate 2 and a second region bent from an end portion of the first region. The second region extends along the first side wall 1*b* toward the bottom 1*a*. The first positive electrode current collector 61 is connected to the positive electrode terminal 8.

The second positive electrode current collector 62 is arranged between the electrode body 3 and the first side wall 1*b* of the rectangular exterior body 1. Specifically, the second positive electrode current collector 62 is formed of a flat plate having surfaces parallel with the first side wall 1*b* and extends along the first side wall 1*b* toward the bottom 1*a*. The second positive electrode current collector 62 is connected to the first positive electrode current collector 61.

Figure 6:
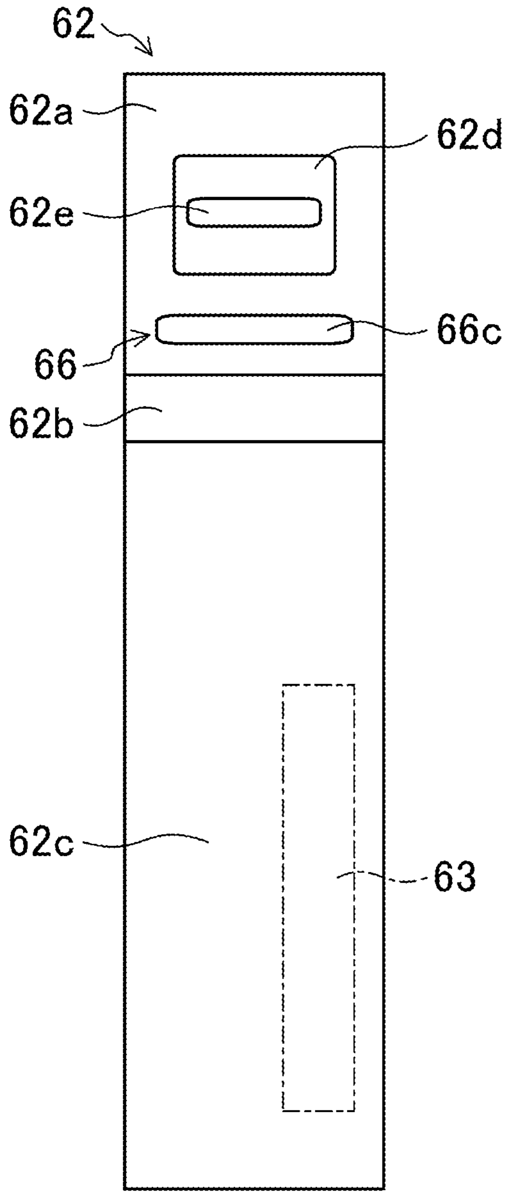
FIG. 6 shows the second current collector.

FIG. 6 shows the second positive electrode current collector 62. The second positive electrode current collector 62 has a current collector connection portion 62*a*, an inclined portion 62*b*, and a tab connection portion 62*c*. The current collector connection portion 62*a* is connected to the first positive electrode current collector 61. The positive electrode tab group 40 is connected to the tab connection portion 62*c*. The inclined portion 62*b* couples the current collector connection portion 62*a* and the tab connection portion 62*c* to each other, and is inclined with respect to both of these connection portions.

The current collector connection portion 62*a* is provided with a recess 62*d*. The recess 62*d* is provided with a through-hole 62*e*. In the recess 62*d*, the current collector connection portion 62*a* is joined to the first positive electrode current collector 61.

The second positive electrode current collector 62 is provided with a fuse 66.

Next, bending of the positive electrode tab group 40 and connection between the positive electrode tab group 40 and the second positive electrode current collector 62 will be described. FIG. 3 shows the vicinity of a connection portion between the second positive electrode current collector 62 and the positive electrode tab group 40 before bending the positive electrode tab group 40.

The positive electrode tab group 40 is connected to the tab connection portion 62*c* of the second positive electrode current collector 62. Specifically, as shown in FIG. 3, the tab connection portion 62*c* and the positive electrode tab group 40 are joined (welded) with the positive electrode tab group 40 arranged on the tab connection portion 62*c* of the second positive electrode current collector 62 before bending the positive electrode tab group 40, thereby forming a connection portion 63.

Here, as shown in FIG. 3, the positive electrode tab group 40 is connected to the tab connection portion 62*c* of the second positive electrode current collector 62 on one side (the right side in FIG. 3) in the width direction of the flat plate. In other words, the connection portion 63 between the positive electrode tab group 40 and the tab connector 62*c* is closer to the base (one side in the width direction, the right side in FIG. 3) of the positive electrode tab group 40 in the width direction of the flat plate. Accordingly, when the positive electrode tab group 40 is bent, a curved shape can be more reliably and stably formed in the vicinity of the base of the positive electrode tab group 40.

The positive electrode tab group 40 may be connected to the tab connection portion 62*c* of the second positive electrode current collector 62 at the center of the flat plate in the width direction thereof.

FIG. 4 shows the vicinity of the connection portion between the second positive electrode current collector 62 and the positive electrode tab group 40 after bending the positive electrode tab group 40. The positive electrode tab group 40 is bent such that the tab connection portion 62*c* of the second positive electrode current collector 62 arranged substantially parallel with a first main surface 3*a* and a second main surface 3*b* of the electrode body 3 (see FIG. 3) is oriented to be substantially perpendicular to the winding axis of the electrode body 3. That is, the positive electrode tab group 40 is bent on a connection portion 63 side with the second positive electrode current collector 62 in parallel with the first side wall 1*b*. The bent positive electrode tab group 40 is fixed to the electrode body 3 with a tape 80.

Figure 7:
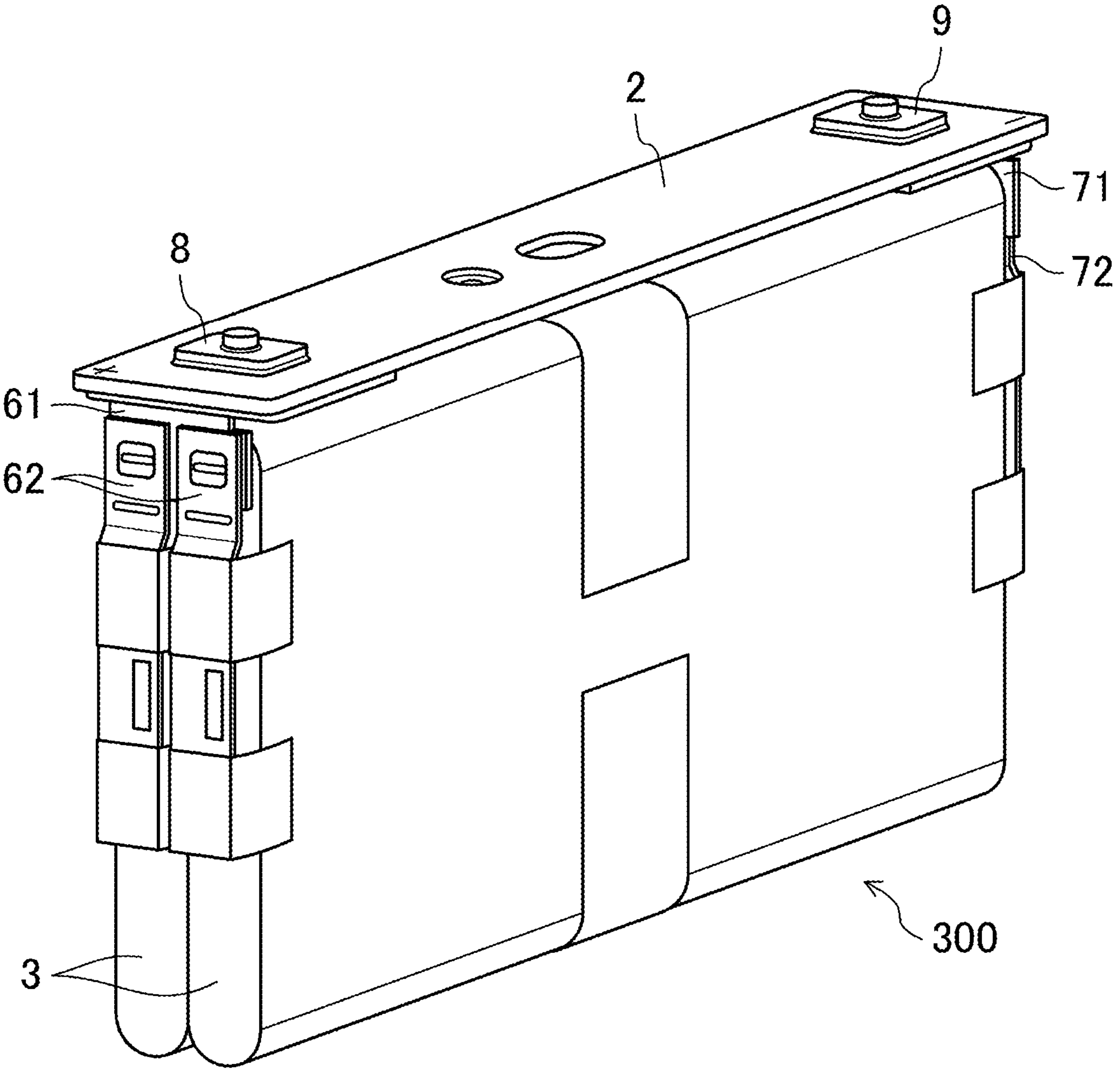
FIG. 7 shows an electrode body group including multiple electrode bodies.

As shown in FIG. 7, the non-aqueous electrolyte secondary battery 20 includes multiple electrode bodies 3. The second positive electrode current collector 62 is connected to the positive electrode tab group 40 of each electrode body 3. The multiple electrode bodies 3 are arrayed and fixed together with a tape to form an electrode body group 300. The second positive electrode current collector 62 provided on each electrode body 3 is connected to one first positive electrode current collector 61 provided on the sealing plate 2.

(Detailed Structure of Electrode Tab)

Hereinafter, the configuration of the electrode tab according to the present embodiment will be described in detail. The positive electrode tab 41 on the positive electrode side will be mainly described as an example, and description of a negative electrode tab on the negative electrode side will be omitted.

Figure 8:
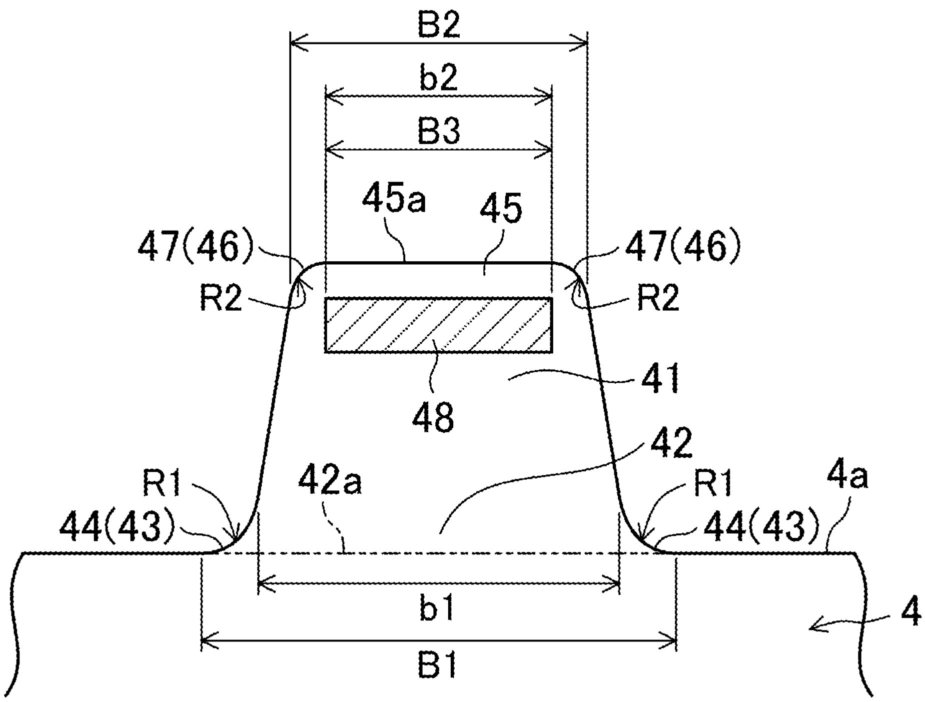
FIG. 8 shows details of the electrode tab according to the present embodiment.

FIG. 8 shows details of the positive electrode tab 41 according to the present embodiment. As shown in FIG. 8, each positive electrode tab 41 extends from one edge 4*a* of the substantially-rectangular positive electrode plate 4 in the lateral direction (the winding axis direction) thereof. Each positive electrode tab 41 extends orthogonally to the edge 4*a* of the positive electrode plate 4. Each positive electrode tab 41 has a substantially quadrangular shape. Specifically, each positive electrode tab 41 is substantially in the form of a trapezoid whose long side is a side 42*a* (a lower base) on a base portion 42 side extending from the positive electrode plate 4 and whose short side is a side 45*a* (an upper base) on a tip portion 45 side in the direction in which the positive electrode tab 41 extends. The side 45*a* of each positive electrode tab 41 on the tip side is parallel with the edge 4*a* of the positive electrode plate 4.

Each of both corner portions 43, 43 on both sides in the Width direction of the base portion 42 of the positive electrode tab 41 continuous to the positive electrode plate 4 is provided with a first rounded portion 44 in a rounded shape. The first rounded portion 44 is formed in an arc shape raised toward the positive electrode plate 4. The first rounded portion 44 is provided to reduce current concentration and stress concentration on the corner portion 43. The curvature radius R1 of the first rounded portion 44 is, for example, equal to or greater than 5 mm in a preferred embodiment.

On the other hand, each of both corner portions 46, 46 on both sides in the width direction of the tip portion 45 in the direction in which the positive electrode tab 41 extends, of the positive electrode tab 41 is provided with a second rounded portion 47 in a rounded shape. The second rounded portion 47 is formed in an arc shape raised toward the opposite side of the positive electrode plate 4. Considering safety upon contact of a worker with the corner portion 46, it is necessary to provide the second rounded portion 47 to form the smooth corner portion 46. The curvature radius R2 of the second rounded portion 47 is, for example, equal to or greater than 1 mm and equal to or less than 2 mm in a preferred embodiment.

In the present embodiment, the curvature radius R1 of the first rounded portion 44 is greater than the curvature radius R2 of the second rounded portion 47.

In the prior application, the curvature radius R1' on the base portion 42 side and the curvature radius R2' on the tip portion 45 side are substantially the same as each other as shown in FIG. 11.

In FIG. 8, reference numeral B1 denotes a width dimension of the base portion 42 including the first rounded portions 11, 44. Reference numeral b1 denotes a width dimension of the base portion 42 excluding the first rounded portions 11, 44. Reference numeral B2 denotes a width dimension of the tip portion 45 including the second rounded portions 47, 47. Reference numeral b2 denotes a width dimension of the tip portion 45 excluding the second rounded portions 47, 47.

In FIG. 8, a hatched portion is a welding area 48 between the positive electrode tab group 40 and the second positive electrode current collector 62. The width dimension B3 of the welding area. 48 is substantially coincident with the width dimension b2 of the tip portion 45 excluding the second rounded portions 47, 47.

(Features and Effects)

As described above, according to the present embodiment, the curvature radius R1 of the first rounded portion 44 on the base portion 42 side and the curvature radius R2 of the second rounded portion 47 on the tip portion 45 side are not the same as each other, but the curvature radius R1 on the base portion 42 side is greater than the curvature radius R2 on the tip portion 45 side.

With this configuration, the curvature radius R1 on the base portion 42 side can be increased as compared to the case (see FIG. 11) where the curvature radius R1' on the base portion 42 side and the curvature radius R2' on the tip portion 45 side are substantially the same as each other as in the prior application.

Figure 12:
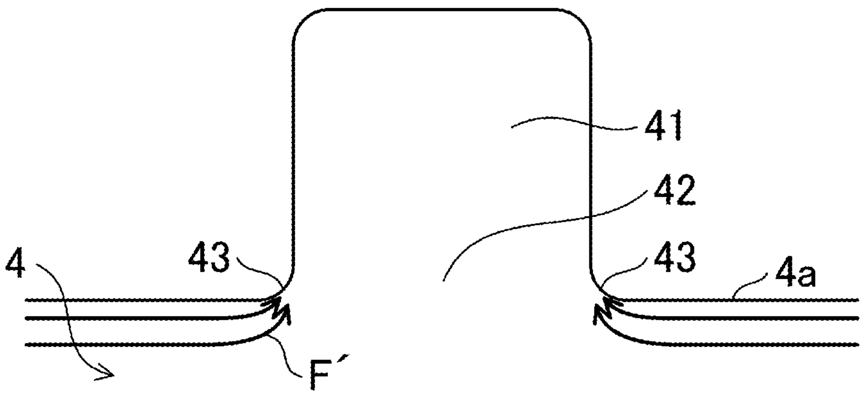
FIG. 12 schematically shows the flow of current from the electrode plate to the electrode tab according to the prior application.

In a case where the curvature radius R1' on the base portion 42 side is smaller as in the prior application (see FIG. 11), current F' flowing along the edge 4*a* of the positive electrode plate 4 does not smoothly flow into the positive electrode tab 41 as shown in FIG. 12. As a result, current concentration may be caused on both corner portions 43 on both sides in the width direction of the base portion 42.

Figure 9:
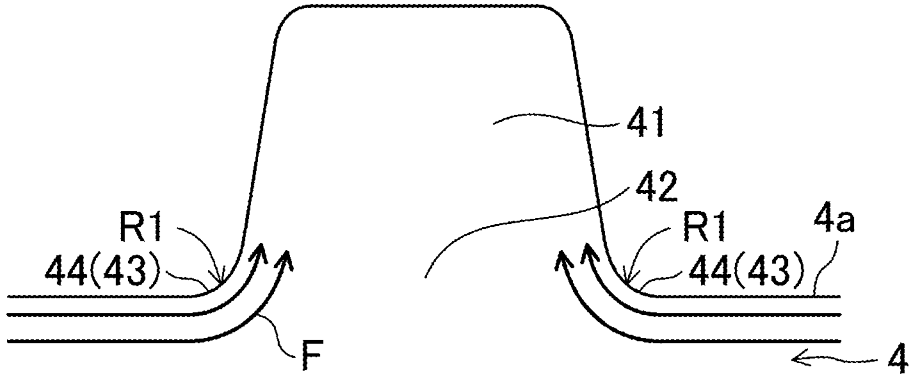
FIG. 9 schematically shows the flow of current from the electrode plate to the electrode tab according to the present embodiment.

In the present embodiment, the curvature radius R1 on the base portion 42 side can be greater as shown in FIG. 8; therefore, current F flowing along the edge 4*a* of the positive electrode plate 4 can smoothly flow into the positive electrode tab 41 as shown in FIG. 9. As a result, current concentration on both corner portions 43 on both sides in the width direction of the base portion 42 can be reduced.

The curvature radius R1 on the base portion 42 side is increased so that stress concentration on both corner portions 43 on both sides in the width direction of the base portion 42 can be reduced. With this configuration, when a load is applied on the positive electrode tab 41 due to, vibration of the non-aqueous electrolyte secondary battery 20 in transport breakage of the positive electrode tab 41 from the corner portion 43 can be reduced. Particularly, the volumetric energy density of the non-aqueous electrolyte secondary battery 20 of the present embodiment is increased by reduction in a dead space. Accordingly, the weight of the non-aqueous electrolyte secondary battery 20 is great, and the load on the positive electrode tab 41 is great. Thus, it is effective to employ the above-described stress concentration reduction structure.

In the present embodiment, only the curvature radius R1 on the base portion 42 side is increased, and the curvature radius R2 on the tip portion 45 side is not increased.

With this configuration, a decrease in the width dimension b2 of the tip portion 45 excluding the second rounded portions 47, 47 can be reduced. In other words, a decrease in the Width dimension B3 of the welding area 48 between the positive electrode tab group 40 and the second positive electrode current collector 62 can be reduced. Accordingly, a sufficient welding area between the positive electrode tab group 40 and the second positive electrode current collector 62 can be ensured. Consequently, a sufficient stability in welding between the positive electrode tab group 40 and the second positive electrode current collector 62 can be ensured.

As described above, the stability in welding between the positive electrode tab group 40 and the second positive electrode current collector 62 can be ensured while current concentration and stress concentration on both corner portions 43 on both sides in the width direction of the base portion 42 of the positive electrode tab 41 continuous to the positive electrode plate 4 are reduced.

The curvature radius R1 of the first rounded portion 44 is set to 5 mm or greater so that current concentration on both corner portions 43 on both sides in the width direction of the base portion 42 can be further reduced. According to simulation, in a case where the curvature radius R1 is 5 mm, a current density (mA/mm$^2$) at the corner portion 43 decreases by 10% or greater as compared to a case where the curvature radius R1 is 2 mm.

Further, the curvature radius R1 of the first rounded portion 44 is set to 5 mm or greater so that stress concentration on both corner portions 43 on both sides in the width direction of the base portion 42 can be further reduced. According to simulation, in a case where the curvature radius R1 is 5 mm, a stress (N/mm$^2$) at the corner portion 43 decreases by 20% or greater as compared to a case where the curvature radius R1 is 2 mm.

The positive electrode tab 41 is formed in the substantially trapezoidal shape so that the current F flowing along the edge 4*a* of the positive electrode plate 4 can more smoothly flow into the positive electrode tab 41 as compared to a case where the positive electrode tab 41 is in a substantially rectangular shape, for example.

The negative electrode side also has a configuration similar to that of the positive electrode side. In FIG. 2, reference numeral 9 denotes a negative electrode terminal, reference numeral 50 denotes a negative electrode tab group, reference numeral 7 denotes a negative electrode current collector, reference numeral 71 denotes a first negative electrode current collector, reference numeral 72 denotes a second negative electrode current collector, reference numeral 12 denotes an external insulating member, and reference numeral 13 denotes an internal insulating member. In FIG. 7, reference numeral 72*a* denotes a current collector connection portion, reference numeral 72*b* denotes an inclined portion, and reference numeral 72*c* denotes a tab connection portion.

Other Embodiments

The present disclosure has been described above with reference to the preferred embodiment, but needless to say, such description is not limited and various modifications can be made.

The above-described structure in which the curvature radius R1 on the base portion 42 side is greater than the curvature radius R2 on the tip portion 45 side may be employed for both or either one of the positive and negative electrode tabs.

In the above-described embodiment, each electrode tab has the substantially trapezoidal shape, but is not limited thereto. Each electrode tab may have, for example, a substantially square shape, a substantially rectangular shape, or another substantially quadrangular shape. Further, each electrode tab is not limited to the substantially quadrangular shape, and may be a substantially polygonal shape with five or more vertices as long as the corner portions are provided on both sides in the width direction of the base portion continuous to the electrode plate thereof and the corner portions are provided on both sides of the tip portion in the direction in which the electrode tab extends thereof.

DESCRIPTION OF REFERENCE CHARACTERS

R1 Curvature Radius
R2 Curvature Radius
B1 Width Dimension
b1 Width Dimension
B2 Width Dimension
b2 Width Dimension B3 Width Dimension
F Current
F' Current
1 Rectangular Exterior Body
1*b* First Side Wall (Side Wall)
2 Sealing Plate
3 Electrode Body
4 Positive Electrode Plate (Electrode Plate)
4*a* Edge
46 Positive Electrode Active Material Layer
8 Positive Electrode Terminal (Electrode Terminal)
20 Non-Aqueous Electrolyte Secondary Battery
40 Positive Electrode Tab Group (Tab Group)
41 Positive Electrode Tab (Electrode Tab)
42 Base Portion
42*a* Side
43 Corner Portion
44 First Rounded Portion
45 Tip Portion
45*a* Side
46 Corner Portion
47 Second Rounded Portion
48 Welding Area
61 First Positive Electrode Current Collector (First Current Collector)
62 Second Positive Electrode Current Collector (Second Current Collector)
63 Connection Portion

The invention claimed is:

1. A secondary battery comprising:

an electrode body including an electrode plate;

a rectangular exterior body having an opening and housing the electrode body;

a sealing plate sealing the opening;

an electrode terminal provided on the sealing plate;

a first current collector arranged between the electrode body and the sealing plate and connected to the electrode terminal;

a second current collector arranged between the electrode body and a side wall of the rectangular exterior body and connected to the first current collector; and a tab group formed such that multiple electrode tabs extending from the electrode plate toward the side wall are stacked on each other and connected to the second current collector, the second current collector being formed of a flat plate having a surface parallel with the side wall, the tab group being bent on a connection portion side with the second current collector in parallel with the side wall, each electrode tab having a first rounded portion formed in a rounded shape and provided at each of corner portions on both sides in a width direction of a base portion continuous to the electrode plate, and a second rounded portion formed in a rounded shape and provided at each of corner portions on both sides in a width direction of a tip portion in a direction in which the electrode tab extends, a curvature radius of the first rounded portion being greater than a curvature radius of the second rounded portion, a width dimension of a welding area between the tab group and the second current collector being substantially coincident with a width dimension of the tip portion excluding the second rounded portions such that areas of the tab group directly adjacent to the welding area and the second rounded portions are free of the welding area, and wherein the width direction of the tip portion is a direction from one side of the tab group to an opposite side of the tab group perpendicular extending from the electrode plate.

2. The secondary battery of claim 1, wherein each electrode tab is substantially in a form of a trapezoid whose long side is a base portion side and whose short side is a tip portion side.

3. The secondary battery of claim 1, wherein the curvature radius of the first rounded portion is equal to or greater than 5 mm.

4. The secondary battery of claim 1, wherein the welding area has a substantially rectangular shape formed at an upper portion of the tab group opposite to the electrode plate and an area of the tab group directly underlying the weld area to the electrode plate is larger than the welding area.

* * * * *